Jan. 13, 1953　　　A. R. MacLAGAN　　　2,624,952
INCLINATION INDICATOR
Filed Jan. 31, 1949　　　2 SHEETS—SHEET 1
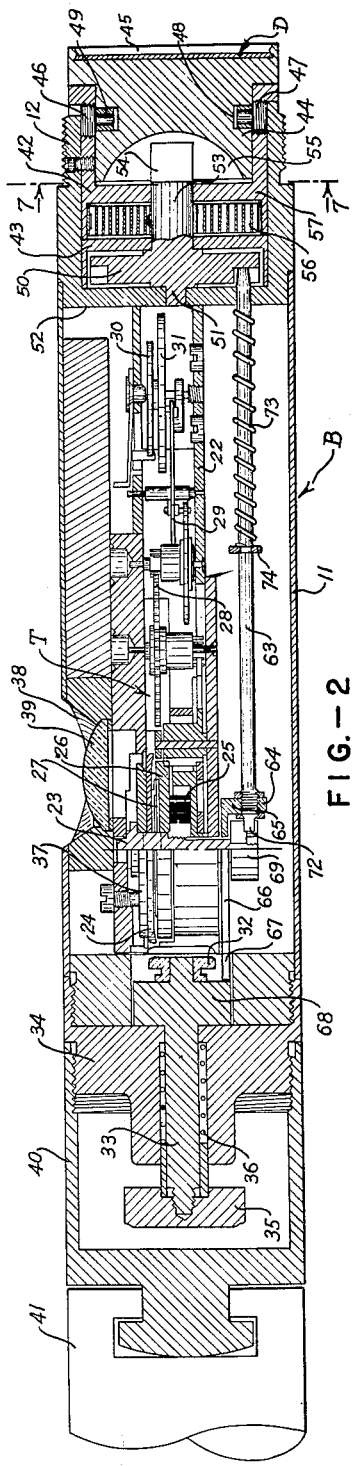
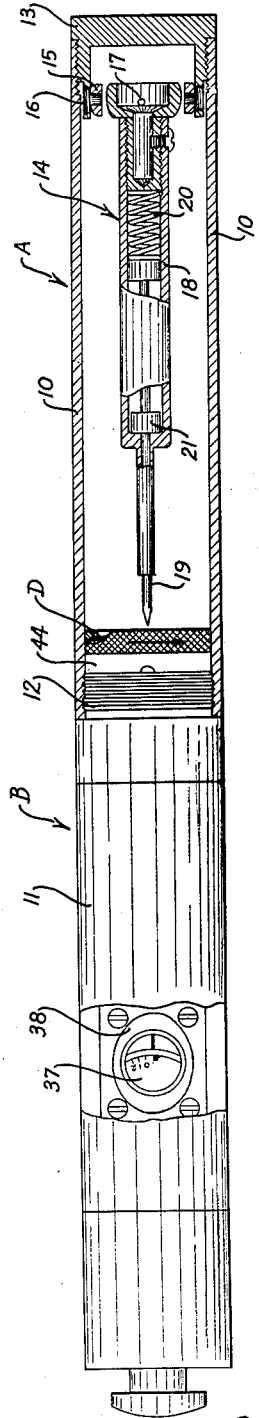
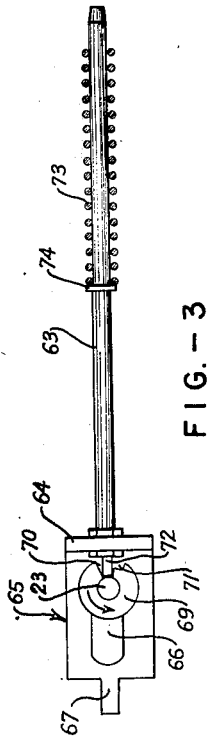
INVENTOR.
Allan R. Mac Lagan
BY
Lamphere and Van Valkenburgh
ATTORNEYS Jan. 13, 1953  A. R. MacLAGAN  2,624,952
INCLINATION INDICATOR Filed Jan. 31, 1949  2 SHEETS—SHEET 2

INVENTOR.
Allan R. MacLagan
BY
Lamphere and Van Valkenburgh
ATTORNEYS

Patented Jan. 13, 1953

2,624,952

UNITED STATES PATENT OFFICE 2,624,952

INCLINATION INDICATOR

Allan R. MacLagan, Denver, Colo., assignor to Eastman Oil Well Survey Company, Denver, Colo., a corporation of Delaware Application January 31, 1949, Serial No. 73,758

22 Claims. (Cl. 33—205.5)

This invention relates to earth bore survey instruments and more particularly to an instrument for ascertaining the inclination of the axis of the bore from the vertical or what is commonly known as "drift."

One of the objects of the invention is to produce an improved inclination indicator of the type wherein the record is made by mechanical means rather than by photographic means.

A further object is to produce a mechanically operated inclination indicator which will be of a simple, rugged construction, compact, easily operated and efficient in obtaining reliable recorded data.

Another object is to produce an improved inclination indicator in which recorded data is obtained by the moving of a member against a marking element carried by a plumb bob to thereby obtain an inclination indicating mark.

Yet another object is to produce an inclination indicator in which a plurality of index marks can be obtained at different places on a recording member by one setting of the indicator mechanism, thereby establishing a record whereby the results can be checked for accuracy without the necessity of a plurality of settings and positionings in a well bore.

A further object is to produce an inclination indicator instrument in which the member to be marked by engagement with a marking element on a plumb bob has both a rotative movement and an axial movement when the mark is established.

A still further object is to produce an inclination indicator in which such a record of the inclination of a well bore is obtained that it will be known with certainty that such record makes available accurate information.

Still another object is the production of an inclination indicator instrument in which differently positioned index marks will be obtained from a plumb bob by a single setting of the instrument mechanism and further in which there will be a swinging disturbance of the plumb bob after each indexing followed by an "at rest" condition prior to the next marking to thereby assure that there will be a record made in which there is no possibility of inaccuracy due to a "hung up" plumb bob.

A further object is to produce a mechanical inclination indicator in which the mechanism cannot be set for operation except in the proper manner.

A further object is to produce an improved operating mechanism for an inclination indicator in which adequate power is available to move a recording member against a plumb bob making element and thereby obtain a clearly recorded mark.

Other objects will become apparent from the following description taken in connection with the accompanying drawings in which:

Figure 1 is a side view of an inclination indicator embodying the invention, the angle unit thereof being shown in section;

Figure 2 is a longitudinal sectional view of the mechanism for setting and operating the recording member or disc to obtain inclination information, said mechanism being shown in an inoperative condition;

Figure 3 is a view of the time controlled release cam and locking rod;

Figure 4:
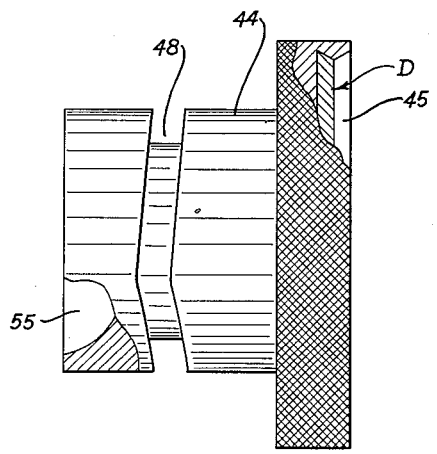
Figure 4 is a side view of the disc carrier member or cup, parts being broken away.

This invention may be considered as an improvement on the inclination indicators shown by United States patents to Wiley, No. 2,305,944, issued June 12, 1942, and Opocensky, No. 2,334,950, issued December 22, 1942.

Referring to the drawings in detail and first to Figure 1, the inclination indicator instrument shown comprises two units, an angle unit A and a setting and control unit B. The unit A is positioned in a cylindrical casing 10 and the unit B is enclosed within a tubular casing 11, said casings being connected together by means of a threaded coupling collar 12. The outer end of the casing 10 of the angle unit is closed by a plug 13 and attached to the inner part of this plug is a plumb bob 14. The connection between the plumb bob and the plug 13 is by means of a universal mounting or cardigan suspension. As shown, a gimbal ring 15 is pivoted to the plug by diametrically positioned gimbal pins 16. To the gimbal ring is pivotally mounted the upper end of the plumb bob by two diametrically positioned pivot pins 17 (one only being shown). The axes of the pivot pins 17 are at right angles to the gimbal pins 16 and thus the plumb bob is free to swing in any direction so that it can always assume vertical position regardless of inclination of the axis of the instrument within limits. The plumb bob has an extending tubular stem 18 in which is reciprocally mounted a marking element or stylus 19 having a projecting sharp point at its lower end. The marking element is pressed downwardly by a spring 20 to its lowermost position, as determined by the stop shoulder 21 carried by and engageable with shoulder means on the lower end of the tubular member 18 of the plumb bob. With this construction of the plumb bob carrying the marking element, it is seen that the point of the marking element can be engaged by an upward movement of a recording member to produce an index mark thereon and at the same time the marking element can yield as the point is engaged. The recording member is in the form of a disc D which will be later described and its position will be beneath the marking element of the plumb bob.

The setting and control mechanism contained in the unit B is shown in assembled condition in Figure 2 and in certain details in Figures 3 to 7, inclusive. One part of this mechanism is a timing mechanism, generally indicated by the letter T and comprises an ordinary watch mechanism suitably mounted on an elongated support structure 22 and arranged in the casing so as to occupy a narrow space. The watch mechanism has a main shaft 23 journaled at its ends in the support structure. A setting or winding gear 24 is fixed to this main shaft by means of which the main spring 25 can be wound and the mechanism set for timed operation. The main shaft also carries a main drive gear 26 which is connectable with the main drive shaft by a friction clutch 27. The remainder of the watch mechanism is of standard construction and includes the usual gear train 28, escapement mechanism 29, hair spring 30 and balance wheel 31.

The setting gear is arranged to be engaged by a winding pinion 32 carried on the end of a winding stem 33 mounted with its axis at right angles to the main shaft 23 of the watch mechanism. The stem mounting comprises a plug 34 carried at the end of casing 11. The outer end of the stem has a winding knob 35 and a spring 36 surrounds the winding stem and acts to normally bias the stem and the winding pinion to a position where it is out of engagement with the winding gear 24.

The winding gear of the watch mechanism carries a dial 37 and a portion thereof is arranged to be visible through a window 38 in the casing 11 of the unit B, said window being provided with a suitable lens 39. The dial is marked to indicate the number of minutes for which the watch is set for operation. To set the watch the knob 35 will be grasped and the winding stem depressed so as to bring the winding pinion into engagement with the setting gear 24 and then upon rotation of the setting gear, together with the main shaft 23, the spring 25 will be wound and placed under tension so as to cause the watch mechanism to operate. The dial will then indicate the elapsed time for which the watch is set to run.

The winding knob is arranged to be covered by a suitable closure cap 40 which is threaded to the plug 34 in which the winding stem is journaled. In winding the watch the cap 40 is removed. This cap can also serve as a connection of the units A and B with a shock absorber member 41 which is interposed between the instrument and one end of a protective casing (not shown) into which the instrument will be placed when it is to be lowered into a well bore to obtain recorded data as to the inclination of the axis of the bore, all of which is well known structure.

The coupling collar 12 which is arranged to connect the upper end of unit B to the lower end of the angle unit A is so constructed as to be provided with the means for operating the recording disc whereby the marking element on the lower end of the plumb bob can produce a recorded mark. As shown in Figure 2, the coupling member 12 carries a bushing 42 and a locating ring 43. Mounted for rotation in the bushing is the recording disc carrier member 44, having a recess 45 in its upper end into which the recording disc D is to be positioned. The bushing 42 carries two diametrically positioned pins 46 and 47 arranged to extend into an annular cam groove 48 cut into the surface of the main body of the disc carrier member 44. The pins are provided with rollers 49 for engagement with the walls of the groove 48.

Figure 5:
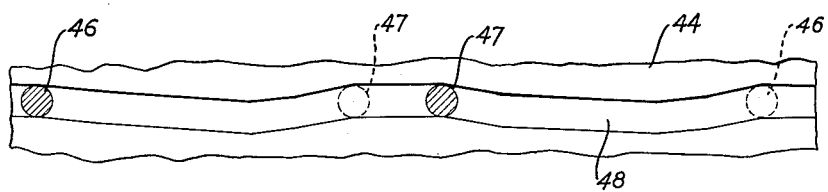
Figure 5 is a layout view of the cam groove in the disc carrier member.

The groove 48 is arranged to have a special configuration to bring about the desired movement of the disc carrier member. A layout of this groove is shown in Figure 5. With this configuration of the groove, it will be seen that if the disc carrier member 44 is given a rotation from a position where the pins 46 and 47 are in the places shown by section in Figure 5, the carrier member will be moved upwardly and downwardly twice by less than 360 degrees of rotation. In fact the double reciprocable movement of the carrier member for the particular cam layout is accomplished with a rotation of the disc carrier member through only 323 degrees.

At the bottom of the bushing within the positioning ring 43 is a rotary control member 50. This member is also shown in further detail in Figure 6. This control member has a short axial extension 51 on its bottom whereby it is journaled in the bottom wall 52 of the coupling collar 12. On the top side of the control member there is another axial extension 53 which is provided with a flat end 54 for reception in a slot 55 in the bottom of the disc carrier member 44, as best shown in Figures 2 and 7. The extension 53 also provides a driving connection for an actuating spring 56 of the clock type whereby the carrier member can be rotated. One end of said spring is connected to extension 53 and the other end connected in fixed relation to the outer wall of the bushing 42. The bushing also has a partition 57 through which the extension 53 projects to thereby provide further bearing support for the control member.

Figure 6:
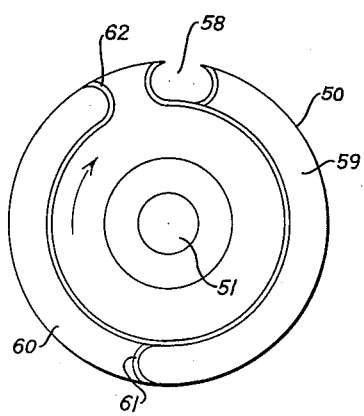
Figure 6 is an end view of the rotary control member for the disc carrier member.
Figure 7:
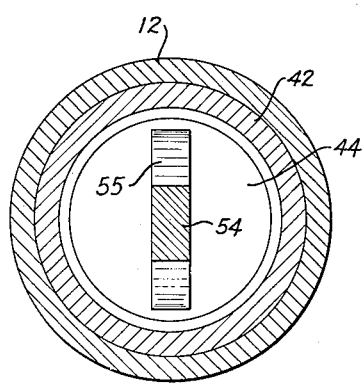
Figure 7 is a section view taken on the line 7—7 of Figure 2 showing details of the connection between the rotary control member and the disc carrier member.

As best shown in Figures 2 and 6, the control member 50 is formed adjacent its periphery with a somewhat elongated opening 58 and two surfaces 59 and 60, the latter being formed by cutting into the cam member from its lower surface to different depths. The surface 59 is arranged to extend for approximately 180 degrees from the opening 58 and is of the greatest depth below the bottom surface of the cam member. The other surface 60, which is of less depth below the bottom surface of the cam member, extends for approximately 123 degrees from the end of the surface 59. Where the surface 59 joins the surface 60, there will be provided a shoulder 61 and at the end of the surface 60 which is adjacent the opening 58 but spaced therefrom is a shoulder 62.

The rotary control member 50 is arranged to be controlled by the watch mechanism previously described through the use of a locking rod 63 shown in both Figures 2 and 3. This pin is positioned longitudinally in the casing 11 of the unit B and extends alongside of the support structure 22 which carries the watch mechanism. The upper end of this rod extends through an opening in the bottom wall 52 of the coupling collar 12 and is arranged to cooperate with the hole 58 in the rotary control member and also the surfaces 59 and 60 and their associated shoulders 61 and 62. The lower end of the rod is connected to a flange 64 of a slidable block 65 having an elongated slot 66 therein, through which projects one end of the main shaft 23 of the watch mechanism. The free end of the block is provided with a projection 67 which is arranged to be engaged by an enlarged portion 68 on the winding stem of the clock mechanism, which enlarged portion is adjacent the winding pinion 32, all as shown in Figure 2. On the outer end of the main shaft 23 of the watch mechanism beyond that portion which extends through the slot 66 of the block there is secured a release cam 69. This cam is provided with a deep notch 70 in its periphery and adjacent thereto is a shallower notch 71. These notches are arranged to receive the lower reduced end 72 of the locking rod 63 which is of such length as to project beyond its connection with the block 65, all as is clearly shown in Figures 2 and 3. The rod 63 is arranged to be biased so that its lower end 72 will always cooperate with the release cam 69 and this is accomplished by means of a coil spring 73 surrounding the rod 63 and having one end engaging a stop 74 on the rod and its other end engaging the bottom wall 52 of the coupling collar.

The locking rod 63 is of such length from end to end that when the lower end 72 is received in the deep notch 70 of the release cam the upper end of the rod will not extend beyond the surface 60 in the control member 50. This will thus permit the control member to be rotated by a rotation of the disc carrier member 44, which can be accomplished by grasping the portion of the carrier which is exposed at the upper end of the coupling collar 12 whenever the casing 10 of the angle unit is removed by unscrewing it from the coupling collar. The spring 56 which is connected between the bushing and the control member is normally placed under some tension and acts to so rotate the control member 50 that it will take a rest or stopped position where the shoulder 62 at the end of the surface 60 will engage the upper end of the locking rod 63. The control member, however, is free to be manually turned from this position by grasping the knurled surface of the disc carrier member and rotating it in the direction of the arrow as shown in Figure 1, which will be a counterclockwise rotation when the carrier member is viewed from the upper end. When the control member has been rotated as far as is possible, approximately 323 degrees, the upper end of the locking rod will be opposite the opening 58 in the cam member. This rotation will further tension the spring 56, then of course the locking rod is free to have such a longitudinal movement in an upward direction that the lower end of the rod can be freed of both notches 70 and 72 and thus allow rotation of the release cam 69. The upward movement of the locking rod is accomplished by an inward movement of the winding stem of the watch since the large portion 68 of the stem will abut the projection 67 on the block 65 and thereby move the block and rod upwardly. Upon this happening, the main shaft 23 of the watch mechanism will then be free to be rotated and the watch spring can be wound up to any desired extent by rotating the winding stem. When the winding stem is rotated, the release cam 69 will be moved in the direction indicated by the arrow in Figure 3 and as a result thereof the peripheral portion of the cam will be moved underneath the end 72 of the locking rod and thus hold its upper end in the hole 58 of the control member 50 and prevent it from being turned by the tensioned clock spring 56. With this control arrangement between the control member 50 and the watch mechanism it is impossible to wind the watch until the clock spring 56 is first wound up by rotating the disc carrying member 44. After the clock spring 56 is wound up the watch mechanism can be wound and set and when this latter operation is done the control member will be locked so that the spring 56 will be held tensioned. It will be noted that the watch mechanism, when wound, can be set for any time desired within limits. It will be further noted that after making a time setting of the watch it can be changed by merely pressing in and rotating the stem. A resetting of the time to elapse can be such as to either increase or decrease the time setting.

When the mechanism is not set, the locking rod 63 will be in a position shown in Figures 2 and 3 and under such condition the lower end 72 will be in the deep notch 70. The upper end of the locking rod will be engaged by the shoulder 62 of the control member, said control member having been moved to such shoulder engaged position by the action of the clock spring 56. To set the mechanism, the knurled portion of the disc carrier member will be grasped and turned in the direction of the arrow. By the connection between the carrier member and the control member the control member will then be rotated to where the upper end of the locking rod is opposite the opening 58. When the control member is so turned, the clock spring will be given additional tension. The control member is now in a position permitting longitudinal upward movement of the locking rod and this is accomplished by pressing inwardly on the knob of the winding stem. The upward movement of the locking rod will then bring the upper end into the opening 58, thereby locking the control member. The upward movement of the locking rod will also position the lower end 72 so that it is free of both notches 70 and 71 of the release cam. The watch mechanism can now be wound and set, which is accomplished by turning the winding stem. When the watch mechanism is wound, the release cam will take a position so that its circular edge will prevent any downward movement of the locking rod which could release the control member 50.

When the control member is locked by the locking rod, the two pins 46 and 47 carried by the bushing 42 will assume positions in the groove of the carrier member as shown by sectioned circles in the cam groove layout of Figure 5. When a sufficient portion of the set time of the watch mechanism elapses so that the release cam 69 will be returned to a position where the lower end of the locking rod can drop into the shallow notch 71, then the control member 50 will be released for rotation by the stored energy in the clock spring 56. The rotation imparted to the control member will move it to a position where the shoulder 61 at the end of the surface 59 will be brought into engagement with the upper end of the locking pin. The extent of rotation of the control member will be approximately 180 degrees. This rotation of the control member will also result in a like rotation of the disc carrier member. Because of the cam groove 48 in the disc carrier member and the pins 46 and 47 positioned therein, the rotation of the carrier member will also be given an axial reciprocation. In other words, the carrier member will be moved upwardly and then back downwardly to its normal position. The pins 46 and 47, after this first rotation of the control member, will have moved 180 degrees from their positions shown in the layout view of Figure 5. In other words, pin 46 will be where pin 47 is shown and pin 47 will be where pin 46 is shown.

As additional time elapses, the release cam will be turned so that the lower end of the locking rod can drop into the deep notch 70. When this happens, the control member will again be freed as the upper end of the locking rod will be withdrawn from the shoulder 61. The control member will then be rotated by the spring to its original inoperative position wherein the shoulder 62 will be brought into engagement with the upper end of the locking rod. The extent of rotation of the control member permitted by the locking rod moving into the deep notch 70 of the release cam will be approximately 143 degrees. The rotation of the control member will cause a like rotation of the carrier member and because of the pins 46 and 47 and the cam groove 48 the carrier member will be given an axial reciprocation, that is, a movement upwardly and downwardly. The pins will then assume positions in the cam groove after the reciprocation, as shown by the dotted circles in Figure 5.

Figure 8:
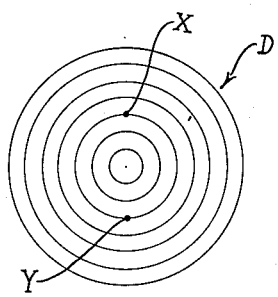
Figure 8 is a view of a recording disc with index marks thereon obtained by operation of the instrument.

The disc D which is to be used in the instrument is shown in Figure 8. It will be constructed of coated paper or other suitable material which can be marked by the marking element 19 of the plumb bob. There also will be provided a plurality of equally spaced concentric lines thereon. The space between each line will indicate a predetermined degree or degrees of inclination.

*Operation*

It is believed to be apparent as to how the inclination indicator just described operates. A brief description, however, will be given in order that the operation will be clear. To set the mechanism to obtain data as to the inclination of a well bore, the casing 10 for the angle unit A will first be unscrewed from the threaded coupling collar 12 of the setting and control mechanism B. This will then expose the end of the carrier member 44 and a recording disc can be placed in the recess at the end thereof. Next, the knurled end of the carrier member will be grasped and rotated as far as possible in the direction indicated by the arrow. This will wind up the clock spring 56 and place the upper end of the locking rod opposite the opening 58. The wall of this opening adjacent the shoulder 62 will be engaged by the locking rod and thus the locking rod will act as a stop to limit the extent of windup of the clock spring. The knob of the winding stem of the watch mechanism is now grasped and the winding stem pushed inwardly as far as possible. This will push the locking rod upwardly into the hole 53, thus locking the control member 50 from rotation by the clock spring and further frees the lower end of the locking rod from the release cam 69. The winding stem is now free to be rotated and the watch mechanism wound up and set for any desired time. This time will be sufficient to allow for assembling the indicator and lowering it in the well bore to the depth where it is desired to obtain information about the inclination of the axis of the bore. The time setting will be that necessary to elapse before the shallow notch 71 of the release cam is presented to receive the lower end 72 of the locking rod.

After the time setting has been made, casing 10 of the angle unit is then screwed into place as shown in Figure 1. This will then place the plumb bob and its marking element in a position where the marking element is spaced slightly above the disc D carried by the carrier member 44. The plumb bob is thus free to have universal movement on its suspension so that it can maintain a vertical position at all times. After the angle unit is attached to the unit B, the instrument is placed in a protecting casing and lowered on a line in the well bore to a point where it is desired to obtain information as to the inclination of the axis of the bore. The angle unit will be above the unit B. The plumb bob will now, due to its suspension, hang on a vertical line, but the axis of the instrument will coincide with the axis of the well bore. Since the recording disc D is positioned in a plane at right angles to the axis of the instrument, the marking element of the plumb bob will be offset from the center of the disc, provided the axis of the well bore has an inclination to the vertical. If there is no inclination of the well bore, then, of course, the marking element of the plumb bob will be directly above the center of the marking disc. After the instrument is in the well for a short period of time, the plumb bob will come to rest and following this the watch mechanism will have so functioned for the time setting period that the release cam will have rotated to a position so that the lower end 72 of the locking rod 63 can drop into the shallow notch 71 under the action of the spring 73 acting on the locking rod. The locking rod will then be pulled out of the opening 58 in the control member and free the control member for rotation under the action of the clock spring 56 and bring the control member to a position where the shoulder 61 on the control member will engage the upper end of the locking pin. The rotation of the control member will also cause a rotation of the disc carrier member 44 and simultaneously with its rotation, due to the pins 46 and 47 and the cam groove, there will be an upward and downward movement of the carrier member. When the carrier member moves upwardly, the disc D will be brought into engagement with the sharp end of the marking element on the plumb bob and consequently this sharp point will produce a mark on the surface of the disc. Such a mark is shown at "X" in Figure 8. At the time of engagement between the disc and the marking element, the disc will be having a rotating movement and this rotating movement will be imparted to the plumb bob through the marking element. Consequently, the plumb bob will be given a twist and thus disturbed from its vertical position. The disc, after making engagement with the marking element, will then be withdrawn away from the marking element by the carrier member 44 because of its downward movement resulting from the pins 46 and 47 and the cam groove contour.

After the mark "X" is made, the watch mechanism will continue to operate and further time will elapse. During this elapsed period of time, the plumb bob will come back to rest. When the watch mechanism is operated sufficiently to rotate the release cam 69 to a position where the lower end 72 of the locking rod can be received in the deep notch 70, the locking pin will again move downwardly under the action of spring 73 and the control member will be released so that it can have a further rotation under the action of the clock spring. This further rotation of the control member will result in a like rotation of the carrier member 44. As the carrier member rotates, the pins 46 and 47 and the cam groove will again result in a reciprocation of the carrier member and this reciprocation will cause the disc to be brought into engagement with the marking element so that a mark such as the mark "Y" (Figure 8) will be placed upon the disc. All the recorded information has now been obtained and the instrument can be withdrawn from the well bore, the angle unit removed and the disc taken out of the carrier member.

It will be noted from the description of the instrument that it is "foolproof." It is not possible to set the watch mechanism unless the disc carrier member has been fully rotated to its "set" or correct operative position and the clock spring is properly tensioned.

It will be noted that in a typical operation or use of the instrument illustrated, the entire inclination indicator including the plumb bob would be agitated during the lowering of the instrument with its protective carrying case into the well bore, and that when the instrument has been brought to rest in the desired position in the well bore this agitation would cease and the plumb bob would come to rest in a true vertical position prior to the recording of the first record mark "X." The recording disc, when caused to be first marked by the plumb bob marking element, is given a rotational movement which insures that the plumb bob will be violently agitated. Sufficient time, as controlled by the spacing of the notches 71 and 70 in the release cam 69, is allowed for the plumb bob to again come to rest after having been so agitated and before the second record mark "Y" is made.

It will be noted that for each recording the plumb bob has first been agitated and has then been free to come to rest in a true vertical position. It will be further noted that the high points of the cam groove 48 come at a specific angular spacing, which, in the example shown, is 180 degrees, and that if the plumb bob has been free to operate in the desired manner the records will appear on the recording disc at the same distance from the center thereof and will be spaced in the same relationship as the high points appear on the cam groove 48 which, in this example, is 180 degrees. Thus, if the record marks "X" and "Y" are at an equal distance from the center of the recording disc and are so spaced it is known that the plumb bob is functioning in the proper manner and that the record marks are a true measure of the bore inclination. If, due to an accumulation of foreign material in the plumb bob suspension bearings or due to damage or wear or other cause for malfunctioning the plumb bob does not operate freely in its correct manner, the plumb bob will not come to rest in a true vertical position after each agitation and the marks on the recording disc will then not be at the same distance from the center of the recording disc and/or will not be spaced in the same relationship as the high points of the cam groove. This irregularity of marking is then a clear proof that the instrument has not functioned properly and that the record is false.

It may sometimes occur that due to error in setting the watch, the instrument is still being lowered in the well bore at the time one or both of the records are being made or, after lowering, insufficient time was allowed for the plumb bob to come to rest before the first record was made. In any such event the plumb bob would be swinging in a random motion instead of being at rest at the time the marking occurred and, therefore, the marks would not be at the same distance from the center of the recording disc and/or would not be spaced in the same relationship as the high points of the cam groove, and thus there will be clear proof that the record is false.

It should further be noted that whereas in the example illustrated the cam groove 48 is shown with two high points and that two pins 46 are used, it is apparent that other numbers of high points could be used on the cam and other numbers of pins so that a different number of regularly spaced records could be made on the recording disc.

Another feature of the structure is that whereby a powerful force is imparted to the carrier member at the time any mark is made so a clear and distinct mark will be made. The clock spring which rotates the disc carrier member has a direct connection with this member, and the camming action whereby a rotative force is transferred into an axial force on the carrier member multiplies the force of the spring in producing the force to make the mark. It is further to be noted that the control and setting mechanism involves only a few parts and these parts are all rugged. The winding of the clock spring for the disc carrier and the setting of the watch mechanism is made by operating two independent members and an interlocking arrangement is present whereby the operation of these independent members must be made in the proper order. Another feature to be noted is that whereby the setting of the watch mechanism can be changed at any time before the instrument is lowered into the well. If there should be a delay for some reason and it is desirable to increase the time setting, such can be done merely by turning the winding stem. It is not necessary to wait until the time set is elapsed and then make a re-setting.

Being aware of the possibility of modification of the particular structure described without departing from the fundamental principles of the invention, it is intended that the scope of the invention is not to be limited in any manner except in accordance with the appended claims.

What is claimed is:

1. An earth bore indicator instrument comprising a plumb bob provided with a marking element, a record member normally spaced from the marking element and mounted to rotate on an axis corresponding to the axis of the bore when the instrument is placed therein, time controlled means for rotating the record member to a first position and then to a second position after an elapse of time, and means causing engagement between the marking element and the record member only when it is rotated.

2. An earth bore inclination instrument comprising a plumb bob provided with a marking element, a rotatable record member normally positioned in spaced relation to the marking element, means for causing marking engagement between the record member and marking element, means for causing a rotation of the record member, and single time controlled means for controlling the functions of both said means so there will be rotation simultaneously with engagement.

3. An earth bore inclination instrument comprising a plumb bob provided with a marking element, a rotatable record member normally positioned in spaced relation to the marking element, means for causing engagement between the record member and marking element, means for causing the record member to have intermittent rotation while not engaged with the marking element so that separated marks can be placed thereon by a functioning of the engagement means, and time controlled means for controlling the engagement and intermittent rotation.

4. An earth bore inclination indicator instrument comprising a plumb bob provided with a marking element, a record member normally positioned in spaced relation to the marking element of the plumb bob, and time controlled means for moving the record member into and out of engagement with the marking element and simultaneously rotating said member during the engaging movement.

5. An earth bore inclination indicator instrument comprising a plumb bob provided with a marking element, a record member normally positioned in spaced relation to the marking element of the plumb bob, and time controlled means for moving the record member into engagement with the marking element at least twice and simultaneously rotating said member during each engaging movement, said rotations occurring at spaced intervals of time.

6. An earth bore inclination indicator instrument comprising a plumb bob provided with a marking element, a record member mounted on an axis which will correspond to the axis of the bore when the instrument is in position therein and being normally positioned in spaced relation to the marking element of the plumb bob, means for moving the record member into engagement with the marking element at spaced time intervals, and time controlled means for causing the record member to have different rotative positions with respect to its axis when it engages the marking element whereby differently positioned indications will be produced.

7. An earth bore inclination indicator instrument comprising a plumb bob provided with a marking element, a record carrier member mounted for rotation and normally positioned in spaced relation to the marking element, means for causing the record member to engage the marking element when rotated, a spring for rotating the record carrier member, means for tensioning the spring, means for holding the spring tensioned, and time controlled means for releasing the holding means.

8. An earth bore inclination indicator instrument comprising a plumb bob provided with a marking element, a record carrier member normally positioned in spaced relation to the marking element, means for causing the record member to engage the marking element when rotated, a spring for rotating the record carrier member, means for tensioning the spring, means for holding the spring tensioned, settable time mechanism for controlling releasing of the holding means, and means for preventing the time mechanism from being set prior to the tensioning of the spring.

9. An earth bore indicator instrument comprising a record member mounted for rotation about an axis corresponding to the axis of the bore when the instrument is placed therein, means for marking the record member so as to indicate the angle between the bore axis and the vertical, means for causing by a rotation of the record member angle indicating marks to be placed thereon at separated points, means for rotating the record member, settable time mechanism for controlling the rotation of the record member, and means preventing setting of the time mechanism prior to the rotating means being conditioned to cause a rotation of the record member.

10. An earth bore indication instrument comprising a record member mounted for rotation about an axis corresponding to the axis of the bore when the instrument is placed therein, means for marking the record member so as to indicate the angle between the bore axis and the vertical, means for causing by a rotation of the record member angle indicating marks to be placed thereon at separated points, tensionable spring means for rotating the record member, settable time mechanism for controlling the rotation of the record member, and means preventing setting of the time mechanism prior to the spring means being tensioned to cause a rotation of the record member.

11. An earth bore inclination indicator instrument comprising a plumb bob provided with a marking element, a record carrier member normally positioned in spaced relation to the marking element, means for rotating said carrier member, means for causing said carrier member when rotated to move axially and first engage and then disengage a record member carried thereby with the marking element, means for holding the carrier member from being rotated, and time controlled means for releasing the holding means.

12. An earth bore inclination indicator instrument comprising a plumb bob provided with a marking element, a record carrier member normally positioned in spaced relation to the marking element, means for rotating said carrier member, means for causing said carrier member when rotated through a predetermined angle to move axially and engage a record member carried thereby with the marking element, means for holding the carrier member from rotation prior to a movement causing the record member to engage the marking element, and time controlled means for intermittently releasing the holding means.

13. An earth bore inclination indicator instrument comprising a plumb bob provided with a marking element, a record member mounted to rotate in a fixed axis, spring means for rotating the record member, means for rotating the record member to a predetermined position when the spring means is tensioned and said member is spaced from the marking element, means for holding the member in such predetermined position, timing mechanism for releasing the holding means to thereby permit the spring means to rotate the record member, means for moving the record member into engagement with the marking element when it is rotated by the spring means, and means for preventing setting of the timing mechanism until the recording member is placed in its said predetermined position and the holding means is operative.

14. An earth bore inclination indicator instrument comprising a plumb bob provided with a marking element, a record carrier member normally positioned in spaced relation to the marking element, spring means for rotating the record carrier member, means for moving the record carrier member axially to cause a record member carried thereby to engage the marking element when the carrier is rotated, means for holding the record carrier member in a predetermined rotative position when turned thereto to tension the spring means, a timing mechanism, means for operating the holding means to a holding condition and setting the timing mechanism, means for preventing said last named means from functioning except when the carrier member is turned to its predetermined position to tension the spring means, and means for releasing the holding means when a set period of time has elapsed.

15. An earth bore inclination indicator instrument comprising a plumb bob provided with a marking element, a record carrier member normally positioned in spaced relation to the marking element, means for rotating the carrier member, means for axially moving the carrier member when rotated to thereby cause it to move a record member carried thereby into engagement with the marking element, means for locking the member and preventing it from being rotated by its rotating means from the normal position, a timing mechanism, a common manually operable member for operating the locking means and setting the timing mechanism, means for preventing setting of the timing mechanism until after the locking means is operated, and means for releasing the locking means when a set period of time has elapsed.

16. An earth bore inclination indicator instrument comprising a plumb bob provided with a marking element, a record member normally spaced from the marking element, means for rotating the record member through an angle not to exceed 360 degrees, and time controlled means for causing the record member to have such a movement as to engage and disengage the marking element not less than twice during said rotation.

17. An earth bore inclination indicator instrument comprising a plumb bob provided with a marking element, a record member normally spaced from the marking element, means for rotating the record member through an angle not to exceed 360 degrees, means for causing the record member to have such a movement as to first engage and then disengage the marking element not less than twice during said rotation, and time means for controlling the rotation of the record member in such a manner that there will be a sufficient elapse of time between engagement of said record member with the marking element that the plumb bob will be at rest at the time of an engagement.

18. An earth bore inclination indicator instrument comprising a marking element and means causing it to assume a position indicating vertical, a record member normally spaced from the marking element, means for moving the record member into engagement with the marking element, means for moving the record member to different positions each time engagement takes place so that separate spaced apart marks will be placed on the record, and time control means for so controlling both movements of the record member that there will be a predetermined time interval between the making of the spaced apart marks.

19. An inclination indicator instrument for an earth bore comprising a rotatable record member, means comprising time controlled means for causing the record member to assume different rotative positions with respect to the axis of the bore when the instrument is placed therein, said last named means including means for holding the record member in said positions so there will be time intervals in which there is no rotation of the record member, means for ascertaining a vertical axis, and means under the control of the time controlled means for indicating on said record member when at different rotative positions the vertical axis as ascertained by said means, the indication on the record being independent and free of connecting markings, said last named means including a marking element normally spaced from the record member and engageable therewith to make the marking indication by relative movement between the element and record member.

20. An inclination indicator instrument for an earth bore comprising means for ascertaining a vertical axis, a record member mounted for rotation and axial movement on an axis corresponding to the earth bore when the instrument is positioned therein, means including a marking element controlled by first named means and normally in spaced relation to the record member for marking the vertical axis on the record member by an axial movement thereof simultaneously with a rotation, and time controlled means for causing the record member to have two axial movements with a predetermined time interval therebetween to obtain two marks thereon and to be in a different rotative position at the time each mark is made.

21. An inclination indicator instrument for lowering in an earth bore to obtain data as to the inclination of its axis with respect to the vertical, said instrument comprising means for ascertaining a vertical axis, a record member, means for rotating the record member on an axis corresponding to the axis of the well bore, time controlled holding means for preventing rotation of the record member by its rotating means at two different positions, means including a marking element normally spaced from the record member for indicating on the record member the vertical axis as ascertained by the first named means when the record member is at the two different positions, and means for obtaining the indication by a relative movement between the member and element which is different from the rotative movement of the member but occurs simultaneously therewith.

22. An earth bore inclination indicator instrument comprising a record carrier member upon which can be mounted a recording disc having concentric circles indicating degrees of inclination, means for mounting the carrier member so the center of the discs to be carried thereby will be positioned to be at an axis extending in the direction of the axis of the bore, means determining a vertical axis, a marking element controlled thereby and normally spaced from the disc, means moving the carrier member and disc to cause the disc to engage the element for marking the position of said vertical axis on the disc so as to indicate the angle between the bore axis and the vertical and simultaneously therewith rotate the carrier member, and means comprising time controlled means for simultaneously moving and rotating the carrier member intermittently so that at least two separated marks of the positions of the vertical axis will be placed on the disc.

ALLAN R. MacLAGAN.

REFERENCES CITED

The following references are of record in the file of this patent:

UNITED STATES PATENTS

| Number | Name | Date |
|---|---|---|
| 959,912 | Bell | May 31, 1910 |
| 1,138,785 | Porter | May 11, 1915 |
| 1,823,336 | Shakhnazarov | Sept. 15, 1931 |
| 1,905,546 | Webster | Apr. 25, 1933 |
| 1,919,332 | Jones | July 25, 1933 |
| 2,109,690 | Culbertson | Mar. 1, 1938 |
| 2,152,671 | Smith | Apr. 4, 1939 |
| 2,205,729 | Monroe | June 25, 1940 |
| 2,255,295 | Miller | Sept. 9, 1941 |
| 2,305,944 | Wiley | Dec. 22, 1942 |
| 2,334,950 | Opocensky | Nov. 23, 1943 |
| 2,341,228 | Moore | Feb. 8, 1944 |
| 2,413,005 | Smith | Dec. 24, 1946 |
| 2,479,377 | Lenzen | Aug. 16, 1949 |

FOREIGN PATENTS

| Number | Country | Date |
|---|---|---|
| 2,781 | Great Britain | of 1906 |